(12) United States Patent
Geifman et al.

(10) Patent No.: US 6,890,574 B1
(45) Date of Patent: May 10, 2005

(54) CLEAR TOMATO CONCENTRATE AS A TASTE ENHANCER

(75) Inventors: Arturo Geifman, Kfar Saba (IL); Dov Hartal, Tel Aviv (IL)

(73) Assignee: Lycored Natural Products Industries Ltd., Beer Sheva (IL)

( * ) Notice: Subject to any disclaimer, the term of this patent is extended or adjusted under 35 U.S.C. 154(b) by 0 days.

(21) Appl. No.: 09/701,237

(22) PCT Filed: May 24, 1999

(86) PCT No.: PCT/IL99/00273

§ 371 (c)(1),
(2), (4) Date: Feb. 15, 2001

(87) PCT Pub. No.: WO99/60868

PCT Pub. Date: Dec. 2, 1999

(30) Foreign Application Priority Data

May 27, 1998 (IL) .................................... 124660

(51) Int. Cl.[7] .............................................. A23L 1/22
(52) U.S. Cl. ..................... 426/534; 426/49; 426/489; 426/650
(58) Field of Search ............................. 426/49, 51, 52, 426/650, 638, 615, 489, 520, 534

(56) References Cited

FOREIGN PATENT DOCUMENTS

| FR | 2 143 434 | 2/1973 |
| WO | WO 95 16363 A1 | 6/1995 |
| WO | WO 97 48287 A1 | 12/1997 |

OTHER PUBLICATIONS

Yoshida Yoji. "Transparent Tomato Mix Drink", Patent Abstracts of Japan, Jun. 2, 1984, JP 59 095869.

Yoshida Yoji. "Transparent Tomato Mix Drink", Patent Abstracts of Japan, Jun. 1, 1984, JP 59 095868.

Mitsuta Hiromitsu, "Transparent Foaming Alcohol Drink Containing Vegetable Juice", Patent Abstracts of Japan, Nov. 5, 1987. JP 62 253368.

Takahashi Naohito, "Preparation of Recombined Tomato Juice", Patent Abstracts of Japan, Oct. 15, 1991, JP 03 240469.

Dainihon Shigyo KK, "Nutrient Drink Based Tomato Juice Contain Transparent Juice Vegetable Fruit Improve Flavour", Derwent Publication Ltd., AN 1984–173912, JP 59 095870 A.

Dainihon Shigyo KK. "Transparent Drink Produce Tomato Juice Treat Above Degree Recover Supernatant Obtain Gravity Separate Add Alkali Metal Ion", Derwent Publication Ltd., AN 1984–173913, JP 59 095871 A.

Fuke et al., "Interactions Between Umani And Other Flavor Characteristics", Trends in Food Science and Technology. Dec. 1996, V. 7.pp 407–411.

De Barros et al., "Thermal Concentration of Tomato Juice. Using Enzymes", Chemical Abstracts 1990. V. 113,39210v.

Bernhardt et al . "Characteristics Of Tomato Concentrates Produced By Direct Juice Concentration And By Serum Concentration", Chemical Abstracts. 1996, V. 125:141036c.

*Primary Examiner*—Leslie Wong
(74) *Attorney, Agent, or Firm*—Browdy and Neimark, P.L.L.C.

(57) ABSTRACT

The present invention relates to a taste enhancer comprising clear tomato concentrate. The present invention also relates to a method of enhancing the flavor of foods comprising adding a clear tomato concentrate to the food in an amount sufficient to enhance the flavor.

21 Claims, No Drawings

CLEAR TOMATO CONCENTRATE AS A TASTE ENHANCER

This application is a National Stage Filing of PCT/IL99/00273, filed May 24, 1999.

FIELD OF THE INVENTION

The present invention relates to a novel taste enhancer. The present invention more particularly relates to a natural taste enhancer having taste enhancing properties as good as if not better than commercially available taste enhancers without the problems associated with the popular taste enhancers, in use by the food industry.

BACKGROUND OF THE INVENTION

The food industry uses flavor enhancers in a variety of savory products. These enhancers consist of monosodium glutamate (hereinafter MSG), hydrolyzed vegetable proteins, disodium salts of the 5'-nucleotides inosine monophosphate (IMP), guanosine monophosphate (GMP) and adenosine monophosphate (AMP), as well as autolysed yeasts. While all have disadvantages, the major enhancer, MSG, suffers from the problem known as Chinese Restaurant Syndrome.

The literature on taste enhancers is very large. A sample reference cited to show the various taste enhancers known is: S. Fuke and Y. Ueda, "Interactions between umami and other flavor characteristics", in *Trends in Food Science & Technology*, Special Issue on Flavor Perception, December, 1996 (Vol. 7), Elsevier Sciences Ltd.

In the processing of tomatoes described in IL 107,999 w have obtained two fractions: serum and pulp where the serum is further concentrated:

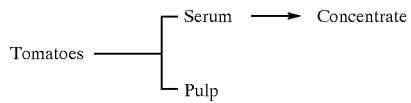

After removing from the tomato juice the pulp, the serum is concentrated to a value that is higher than 4.5° Bx which is the normal value of crushed tomatoes to reach a Bx value of 80 Bx. It can then be hydrolyzed (or hydrolyzed and then concentrated). This product is commonly referred to as Clear Tomato Concentrate (CTC)—although it is clear only when it is in the 4.5° Bx region while at higher Bx values it becomes opaque.

OBJECTIVE OF THE INVENTION

The objective of the present invention is to afford a novel taste enhancer the Clear Tomato Concentrate which lacks the dominant tomato flavor to enable it to be used in a variety of savory food and beverage products and not only those based on tomatoes. It is a further objective of the present invention to afford a taste enhancer with little of no chance of causing Chinese Restaurant Syndrome.

STATEMENT OF THE INVENTION

A taste enhancer comprising clear tomato concentrate, and a method of enhancing the flavor of foods comprising adding a clear tomato concentrate to the food in an amount sufficient to enhance the flavor.

DETAILED DESCRIPTION OF THE INVENTION

Tomato Serum Concentrate contains 8–10% soluble proteins and free amino acids. By hydrolyzing the proteins, one can increase the concentration of free amino acids, an in this way intensity the flavor enhancing properties of the concentrate where the hydrolysis occurs due to the presence of natural tomato acids. The rate of hydrolysis increases by heating, and depends on the time and temperature. The results of acid hydrolysis of the Tomato Serum Concentrate are shown in Table 1.

The tomato proteins (in the concentrate or in the serum prior to concentration) can also be hydrolyzed by enzymes at relatively low temperatures.

For this we have used fungal, protease/peptidase enzyme formualation developed by Novo Nordisk, and sold under the name of "flavourzyme". Almost complete protein hydrolysis was obtained after one-hour enzyme treatment at 50°. The enzyme was subsequently inactivated by heating at 80° for a short period. The results of enzymatic hydrolysis of the Tomato Serum Concentrate are shown in Table 2.

Hydrolysis before or after concentration of the Tomato Serum yielde essentially the same results—namely an excellent food flavor enhancer.

A further embodiment of the invention is to use the flavor enhancer in powder form. Thus the Clear Tomato Concentrate, after the steps of hydrolysis and concentration, is either sprayed dried or dried using any other conventional dehydration techniques used by the food industry. The Clear Tomato Concentrate can be dried on a variety of materials such as maltodextrins, starches, sugars, carbohydrates, their derivatives or salts used as carriers to facilitate drying.

EXAMPLE 1

Clear Tomato Concentrate In Powder Form

Clear Tomato Concentrate and maltodextrine 19 DE (dextrose equivalent) were diluted with water to the appropriate viscosity and sprayed dried to a free flowing powder containing 3–5% moisture.

EXAMPLE 2

Flavor Enhancin Properties of Clear Tomato Concentrate

The food and flavor enhancing properties of the hydrolyzed and concentrated (in either order) Clear Tomato Concentrate are demonstrated in taste trials in which three different types of products (namely hamburger, Paolla rice, and vegetable soup) were prepared in three versions:
1. Control (with no flavor enhancers).
2. Product plus pure MSG (0.3% in the final product).
3. Product plus Clear Tomato Concentrate, 60° Bx (0.5% in end Product).

Fifteen tasters were asked to answer two questions for each product:
1. Which of the three samples is substantially different?
2. Which one of the remaining products do you prefer?

The results of the first question was as follows:
Hamburger: All 15 participants recognized the control as different and inferior.
Paolla Rice: All 15 participants recognized the control as different and inferior.
Vegetable Soup: All 15 participants recognized the control as different and inferior.

The results for the second question were as follows:
Hamburger: participants preferred the hamburger with MSG; 9 preferred the hamburger with the Clear Tomato Concentrate; and 3 had no preference.
Paolla Rice: One participant preferred the sample with MSG; 12 participants preferred the sample with Clear Tomato Concentrate; and 2 had no preference.

Vegetable Soup: Six participants preferred the soup with MSG; 5 participants preferred the sample with Clear Tomato Concentrate and 4 had no preference.

From this taste panel we see that the Clear Tomato Concentrate containing a total of 4–5% glutamic acid and glutamine is equal to or better than pure MSG with no problem of the Chinese Restaurant Syndrome. It is believed that this superior enhancing property is due to synergism between the glutamic acid and glutamine on the one hand and the various other amino acids present in the clear Tomato Concentrate on the other hand.

TABLE 1

CONCENTRATION OF FREE AMINO ACIDS IN TOMATO SERUM (60° Bx) AFTER ACID HYDROLYSIS

| Compound | CONC mg/kg |
|---|---|
| Aspartic acid | 11904.12 |
| Threonine | 1117.25 |
| Serine | 1279.80 |
| Asparagine | 5684.74 |
| Glutamic acid | 26501.90 |
| Glutamine | 12942.68 |
| Proline | 276.54 |
| Glycine | 280.20 |
| Alanine | 4574.41 |
| Valine | 440.16 |
| Methionine | 152.93 |
| Isoleucine | 531.46 |
| Leucine | 623.99 |
| Tyrosine | 419.01 |
| Phenylalanine | 1567.32 |
| Gamma aminobutyric | 9908.32 |
| Ethanolamine | 148.30 |
| Tryptophane | 16.56 |
| Lysine | 1010.62 |
| Histidine | 1036.93 |
| Arginine | 905.63 |
| Total | 80321.87 |

TABLE 2

CONCENTRATION OF FREE AMINO ACIDS IN TOMATO SERUM (60° Bx) AFTER ENZYMATIC HYDROLYSIS

| Compound | CONC mg/kg |
|---|---|
| Aspartic acid | 12393.07 |
| Threonine | 1186.59 |
| Serine | 1370.29 |
| Asparagine | 4565.77 |
| Glutamic acid | 26647.74 |
| Glutamine | 11464.92 |
| Proline | 280.31 |
| Glycine | 332.54 |
| Alanine | 4570.03 |
| Valine | 488.21 |
| Methionine | 156.60 |
| Isoleucine | 522.86 |
| Leucine | 612.15 |
| Tyrosine | 435.35 |
| Phenylalanine | 1598.48 |
| Gamma aminobutyric | 10271.85 |
| Ethanolamine | 167.84 |
| Tryptophane | 26.97 |
| Lysine | 1058.58 |
| Histidine | 1061.20 |
| Arginine | 926.63 |
| Total | 79016.99 |

What is claimed is:

1. A method of enhancing the flavor of foods comprising adding a clear tomato concentrate as a taste enhancer to the food in a quantity sufficient to enhance the flavor of the food and in a sufficiently small amount so that no tomato flavor is imparted to the food, said clear tomato concentrate consisting of a hydrolyzed and concentrated tomato serum.

2. A method of enhancing the flavor of foods according to claim 1 comprising adding said clear tomato concentrate in combination with another suitable flavor enhancer or mixtures thereof in sufficient quantity to enhance the flavor of the food.

3. A method of enhancing the flavor of foods in accordance with claim 2, wherein the additional flavor enhancer is selected from the group consisting of monosodium glutamate (MSG), hydrolyzed vegetable proteins, disodium salts of the 5'-nucleotides inosine monophosphate (IMP), guanosine monophosphate (GMP) and adenosine monophosphate (AMP) and autolysed yeasts.

4. A method in accordance with claim 1, wherein the taste enhancer contains 0.5% to 20% free amino acids.

5. A method in accordance with claim 4, wherein the taste enhancer contains 4% to 15% free amino acids.

6. A method in accordance with claim 4, wherein the taste enhancer contains 8% to 10% free amino acids.

7. A method in accordance with claim 1, wherein the hydrolysis is carried out using the natural acid present in the concentrate serum, and heat.

8. A method in accordance with claim 1, wherein the hydrolysis is carried out via proteolytic enzymes.

9. A method in accordance with claim 1, wherein the clear tomato concentrate is in the form of a powder.

10. A method in accordance with claim 1, wherein the clear tomato concentrate is spray dried on a suitable carrier.

11. A method in accordance with claim 1, wherein the clear tomato concentrate is present with a carrier selected from the group consisting of maltodextrins, starch, starch derivatives, sugars, corn syrup solids, gums, salts and mixtures thereof.

12. A method in accordance with claim 1, wherein the clear tomato concentrate is obtained by separating the serum from tomato juice and concentrating it.

13. A method in accordance with claim 12, wherein the serum is concentrated to Bx values of 8 to 80.

14. A method in accordance with claim 13, wherein the serum is concentrated to Bx values of 8 to 60.

15. A method in accordance with claim 2, wherein the hydrolysis is carried out using the natural acid present in the serum, and heat.

16. A method in accordance with claim 2, wherein the hydrolysis is carried out via proteolytic enzymes.

17. A method in accordance with claim 2, wherein the clear tomato concentrate is in the form of a powder.

18. A method in accordance with claim 2, wherein the clear tomato concentrate is spray dried on a suitable carrier.

19. A method in accordance with claim 2, wherein the carrier is selected from the group consisting of maltodextrins, starch, starch derivatives, sugars, corn syrup solids, gums, salts and mixtures thereof.

20. The method of claim 1 wherein said clear tomato concentrate contains a total of 4–5% glutamic acid and glutamine.

21. The method of claim 1 wherein said sufficient quantity to enhance the flavor of the food is about 0.5% based on the weight of said food.

* * * * *